United States Patent [19]

Okuda et al.

[11] Patent Number: 5,102,162

[45] Date of Patent: Apr. 7, 1992

[54] SUSPENSION CONTROL APPARATUS

[75] Inventors: Eiichiro Okuda, Habikino; Masuo Takigawa, Ikoma, both of Japan

[73] Assignee: Matsushita Electric Industrial Co., Ltd., Kadoma, Japan

[21] Appl. No.: 602,140

[22] Filed: Oct. 23, 1990

[30] Foreign Application Priority Data

Oct. 24, 1989 [JP] Japan .................................. 1-277473

[51] Int. Cl.[5] .......................................... B60G 17/00
[52] U.S. Cl. .................... 280/707; 280/703; 280/772; 364/424.05
[58] Field of Search .................... 280/707, 772, 703; 364/424.05

[56] References Cited

U.S. PATENT DOCUMENTS

| | | | |
|---|---|---|---|
| 4,624,477 | 11/1986 | Kumagai et al. | 280/707 |
| 4,671,112 | 6/1987 | Kimura et al. | 73/505 |
| 4,730,843 | 3/1988 | Tanaka et al. | 280/707 |
| 4,761,022 | 8/1988 | Ohashi et al. | 280/772 |
| 4,821,188 | 4/1989 | Ikemoto et al. | 280/707 |
| 4,853,860 | 8/1889 | Achenbach | 280/707 |
| 4,865,148 | 9/1989 | Marumoto et al. | 280/707 |
| 4,867,476 | 9/1989 | Yamanaka et al. | 280/707 |

FOREIGN PATENT DOCUMENTS

| | | |
|---|---|---|
| 0157576 | 10/1985 | European Pat. Off. . |
| 0236947 | 9/1987 | European Pat. Off. . |
| 58-167209 | 10/1983 | Japan . |
| 61-287806 | 12/1986 | Japan . |
| 62-55210 | 10/1987 | Japan . |
| 63-68413 | 3/1988 | Japan . |

OTHER PUBLICATIONS

European Search Report Feb. 14, 1991, 90 12 0211.

*Primary Examiner*—Kenneth R. Rice
*Attorney, Agent, or Firm*—Cushman, Darby & Cushman

[57] ABSTRACT

A vehicle behavior during cornering and turning is correctly grasped by computing and map-retrieving from output signal (V) of a vehicle speed sensor (1) and output signal (ωy) of a yaw angular velocity sensor (2) for detecting angular velocity about a yaw axis (B) of the vehicle (11), and rolling motion of the vehicle (11) during ordinary-turning or quick-turning is restrained by increasing damping force of shockabsorbers (3) of the suspension control apparatus.

6 Claims, 4 Drawing Sheets

SUSPENSION CONTROL APPARATUS

FIELD OF THE INVENTION AND RELATED ART STATEMENT

1. Field of the Invention

The present invention relates to a suspension control apparatus for controlling a vehicle posture by changing a damping of its suspension by change of damping force of a shock absorber so as to decrease rolling.

2. Description of the Related Art

Stability of vehicle behavior is marred by rolling movement of the vehicle during cornering or turning. Various suspension apparatuses or system have been hitherto disclosed to improve the stability of the vehicle behavior during turning. For instance, the Japanese published unexamined patent application No. Sho 58-167210 (Tokkai Sho 58-167210) discloses a means for improvement of the stability of vehicle behavior during turning, wherein a damping force of a shock absorber is controlled by signals responding to vehicle speed and angular velocity of a steering wheel of the vehicle. The turning state of the vehicle is indirectly inferred from the signal of the angular velocity of the steering wheel. Therefore, actual turning state of the vehicle can not be correctly grasped, and the vehicle can not be controlled to appropriately restrain the rolling motion of the vehicle during turning by such means. In particular, it has been difficult to control to decrease the rolling motion caused by a quick-turning of vehicle by the conventional apparatus. And further, such means have some problems in the stability of vehicle behavior. If a damping force of the shock absorber is controlled too small, the rolling motion of the vehicle at turning can not be controlled. On the contrary, if the damping force is too large it makes the ride comfort poor.

The Japanese published unexamined patent application No. Sho 63-68413 (Tokkai Sho 63-68413) discloses another conventional suspension control apparatus having a vehicle speed sensor and three angular velocity sensors for directly detecting a vehicle behavior. The three angular velocity sensors detect a yaw angular velocity, a pitch angular velocity and a roll angular velocity. Thereby the vehicle behavior is grasped and the damping force of the shock absorber is controlled in response to the vehicle behavior.

The above-mentioned yaw angular velocity is an angular velocity in a rotation about vertical line (yaw axis) at a center of the vehicle. The pitch angular velocity is an angular velocity in a rotation about a lateral axis (pitch axis) of the vehicle. The roll angular velocity is an angular velocity in a rotation about a longitudinal axis (roll axis) of the vehicle.

This conventional suspension control apparatus (Tokkai Sho 63-68413), which is for controlling to decrease a rolling motion of the vehicle behavior by using these signals from three angular velocity sensors, has the following problems. An arithmetic unit of the suspension control apparatus carries out a complicated computing using three input signals of the yaw angular velocity, the pitch angular velocity and the roll angular velocity. Therefore, this suspension control apparatus needs a considerable time for computing these data. For example, in case of using a CPU (Central Processing Unit) of 8 bit as the arithmetic unit, the operation time for computation of a control signal, namely the time period from reception of detection signals the arithmetic unit to issuance of output signal to the actuators takes about 20 msec. Therefore, the apparatus having the CPU of 8 bit can not control in response to a rolling motion during quick-turning. Therefore, the convention suspension control apparatus necessitates to use a higher speed CPU as the arithmetic unit, such as a CPU of 16 bit for controlling to decrease such rolling motion. However, to use such high speed CPU in the vehicle increases the manufacturing cost of the vehicle.

OBJECT AND SUMMARY OF THE INVENTION

An object of the present invention is to provide a suspension control apparatus which can achieve a high stability of a vehicle behavior and at the same time an improved ride comfort of the vehicle during turning, without increase of manufacturing cost.

In order to achieve the above-mentioned object, the suspension control apparatus of the present invention comprises:

a vehicle speed sensor for detecting speed of a vehicle, a yaw angular velocity sensor for detecting angular velocity about a yaw axis of the vehicle, turning state inference means which infers turning state of the vehicle from an output signal of the vehicle speed sensor and an output signal of the yaw angular velocity sensor, and shockabsorber means wherein damping force is controlled in response to an output signal of the turning state inference means.

A rolling state of the vehicle during ordinary-turning and quick-turning can be controlled by function of the suspension control apparatus of the present invention. And further, an unstable movements, such as rolling or tottering of the vehicle after finish of ordinary-turning or quick-turning are restrained. As a result, ride comfort and stability of a vehicle behavior is improved by using the suspension control apparatus of the present invention, which has simple construction and of low cost.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter, preferred embodiments of the suspension control apparatus of the present invention are elucidated with reference to the accompanying drawings of FIGS. 1 to 4.

Figure 1:
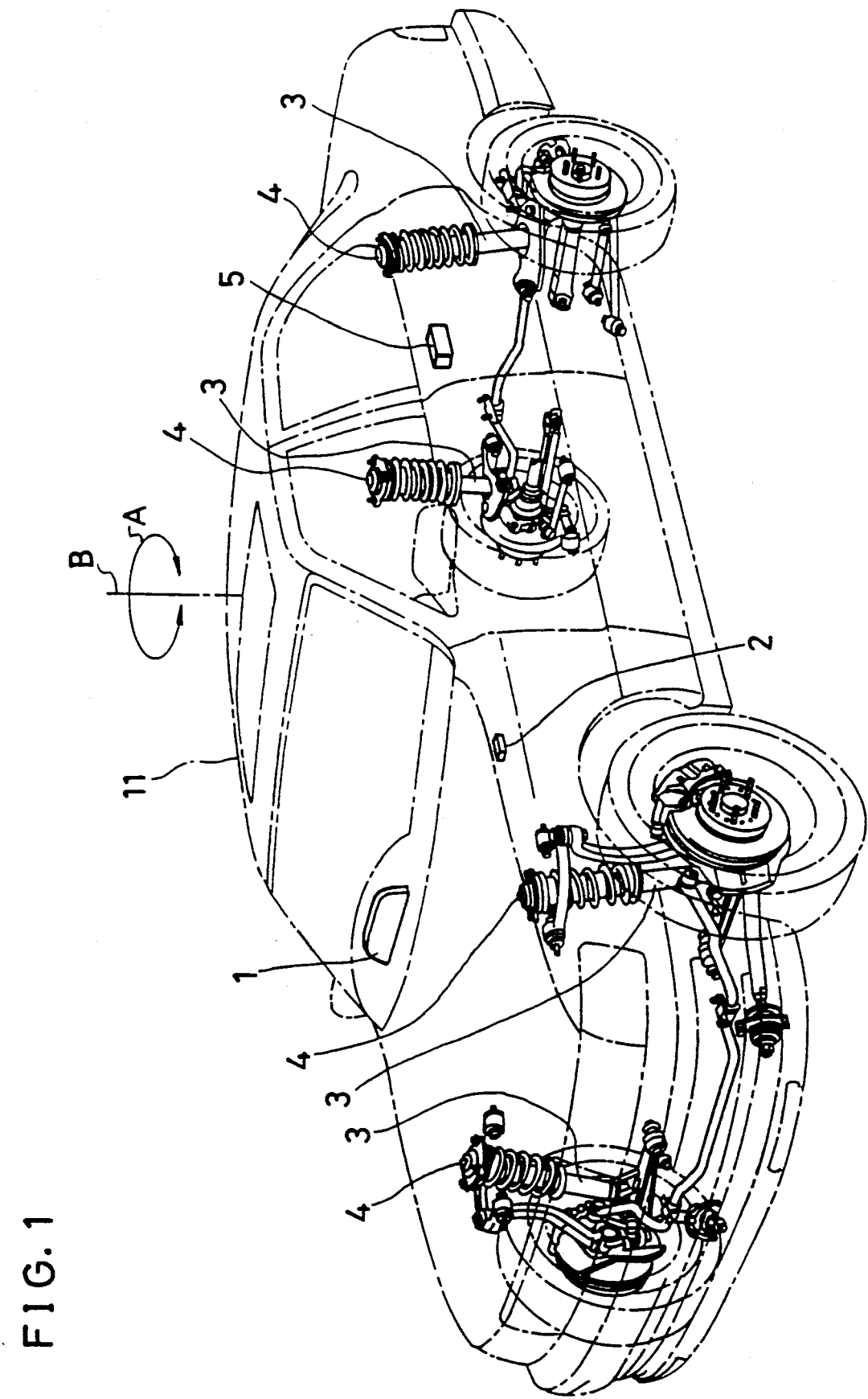
FIG. 1 is a perspective view showing principal parts of a suspension control apparatus of the present invention in a vehicle shown with alternate long and short dash line.

FIG. 1 is a perspective view showing a principal part of the suspension control apparatus which is disposed in a vehicle 11 shown with alternate long and short dash line. The suspension control apparatus comprises a vehicle speed sensor 1, a yaw angular velocity sensor 2, shockabsorbers 3, actuators 4 and a controller 5. The vehicle speed sensor 1, which is disposed in a front grill adjacent a speed meter, produces signal responding to the vehicle speed, by detecting the revolution speed of an output shaft of a gearbox in the vehicle 11. The yaw angular velocity sensor 2 is provided to detect an angular velocity of rotation about a vertical line at substantially a center of the vehicle 11, that is about a yaw axis B of the vehicle 11. The directions of the rotation is shown with an arrow A in FIG. 1. The yaw angular velocity sensor 2, for instance described in U.S. Pat. No. 4,671,112 which is issued June 9, 1987 and filed by same assignee is usable. The shockabsorbers 3 damp the force received by wheels of the vehicle 11. The actuators 4, which are provided on the shockabsorbers 3, control the damping force of these shockabsorbers 3. The controller 5, which is disposed in appropriate space, such as under the back seat or in the trunk, produces the output signal for controlling the damping force of the shock absorber 3. The actuator 4 operates the shock absorber 3 by receiving a signal which is produced by the controller 5 in response to the output signals of the vehicle speed sensor 1 and the yaw angular velocity sensor 2.

Figure 2:
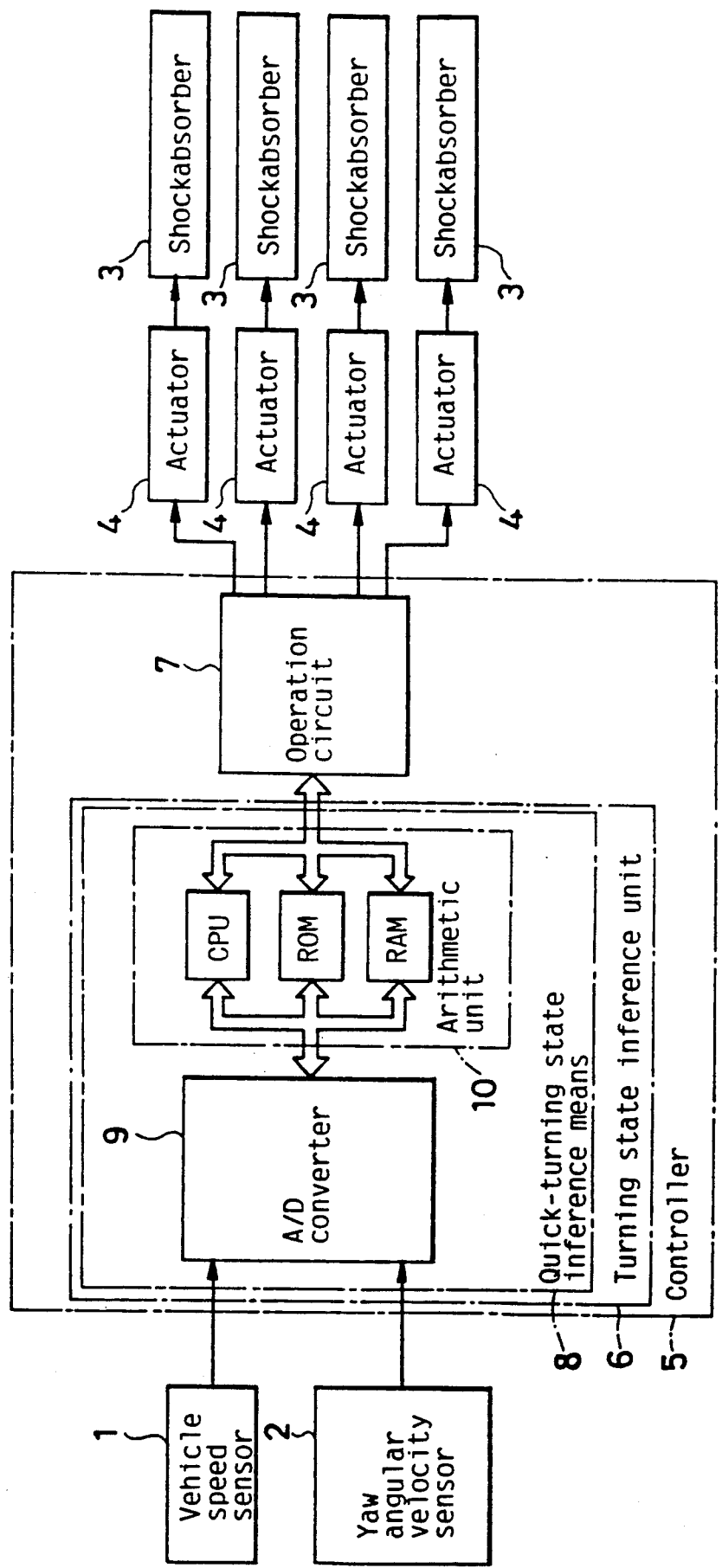
FIG. 2 shows a block diagram of the suspension control apparatus shown in FIG. 1.

FIG. 2 is a block diagram of the suspension control apparatus of the present invention. As shown in FIG. 2, the controller 5 is constituted by a turning state inference unit 6 and an operation circuit 7. Table 1 below shows the map for the turning state inference unit 6 wherein inferred rolling state caused by the turning vehicle is issued by retrieving the map by using output signal V of the vehicle speed sensor 1 and output signal $\omega y$ of the yaw angular velocity sensor 2.

TABLE 1

| Yaw angular velocity | Vehicle speed | | | | |
|---|---|---|---|---|---|
| | V0–V1 | V1–V2 | V2–V3 | V3–V4 | V4–V5 |
| $\omega y1$–$\omega y2$ | DUMP 0 | DUMP 1 | DUMP 2 | DUMP 3 | DUMP 5 |
| $\omega y2$–$\omega y3$ | DUMP 0 | DUMP 2 | DUMP 4 | DUMP 6 | DUMP 7 |
| $\omega y3$–$\omega y4$ | DUMP 0 | DUMP 3 | DUMP 6 | DUMP 8 | DUMP 9 |
| $\omega y4$–$\omega y5$ | DUMP 0 | DUMP 5 | DUMP 7 | DUMP 9 | DUMP 10 |

DUMP 0, DUMP 1, DUMP 2, - - -, DUMP 10 in the table 1 indicate different relative damping rates of the shockabsorber 3. DUMP 0 is usually the damping rate during the vehicle is normally driving straight. The damping rate DUMP0 is given by following formula (1);

$$DUMP0 = \frac{C}{2\sqrt{M \cdot K}} \quad (1)$$

where C is the damping coefficient $$\left(\text{unit: } \frac{N \cdot \text{sec}}{m}\right)$$

of the shockabsorber 3 during the vehicle is normally driving straight, M is the sprung mass $$\left(\text{unit: } \frac{N \cdot \text{sec}^2}{m}\right)$$

and K is the spring constant $$\left(\text{unit: } \frac{N}{m}\right)$$

of the suspention.

DUMP 0, DUMP 1, DUMP 2, - - -, DUMP 10 are set up to satisfy the following inequity (2);

DUMP 0 < DUMP 1 < DUMP 2 < DUMP 3 < DUMP 4 < DUMP 5 < DUMP 6 < DUMP 7 < DUMP 8 < DUMP 9 < DUMP 10    (2).

Table 2 below shows the operating parameters which are found preferable through experiments.

TABLE 2

| Yaw angular velocity | Vehicle speed | |
|---|---|---|
| | 0(km/h) or more –below 20(km/h) | 20(km/h) or more –below 40(km/h) |
| 7(deg/sec) or more –below 10(deg/sec) | 0.20 | 0.25 |
| 10(deg/sec) or more –below 13(deg/sec) | 0.20 | 0.30 |
| 13(deg/sec) or more –below 16(deg/sec) | 0.20 | 0.35 |
| 16(deg/sec) or more | 0.20 | 0.45 |

| Yaw angular velocity | Vehicle speed | |
|---|---|---|
| | 0(km/h) or more –below 20(km/h) | 20(km/h) or more –below 40(km/h) |
| 7(deg/sec) or more –below 10(deg/sec) | 0.30 | 0.35 |
| 10(deg/sec) or more –below 13(deg/sec) | 0.40 | 0.50 |
| 13(deg/sec) or more –below 16(deg/sec) | 0.50 | 0.60 |
| 16(deg/sec) or more | 0.55 | 0.65 |

| Yaw angular velocity | Vehicle speed 80(km/h) or more |
|---|---|
| 7(deg/sec) or more –below 10(deg/sec) | 0.45 |
| 10(deg/sec) or more –below 13(deg/sec) | 0.55 |
| 13(deg/sec) or more –below 16(deg/sec) | 0.65 |
| 16(deg/sec) or more | 0.70 |

In FIG. 2, the turning state inference unit 6 for detecting the state of the turning vehicle and the operation circuit 7 for driving the actuators 4 are provided in the controller 5. The turning state inference unit 6 comprises an A/D converter 9 and an arithmetic unit 10, such as a logical circuit having a CPU, a ROM and a RAM. The A/D converter 9 and the operation circuit 7 for driving the actuators 4 are connected to transmit the data through the arithmetic unit 10 by data bus. When the vehicle 11 is turning, the yaw angular velocity sensor 2 issues the output signal $\omega y$, and the output signal V from the vehicle speed sensor 1 and the output signal $\omega y$ from the yaw angular velocity sensor 2 are received by the turning state inference unit 6 of the controller 5. The vehicle speed sensor 1 produces the output signal V according to the speed of revolution of the rotating wheel. The turning state inference unit 6 supposes the rolling state during turning by retrieving the map (table 1) and by computing with the output signal V of the vehicle speed sensor 1 and the output signal $\omega y$ of the yaw angular velocity sensor 2. As a result, the turning state inference unit 6 produces an output signal for controlling to decrease the rolling state. The operation circuit 7 which receives the signal from the turning state inference unit 6 produces signals for driving each actuators 4, and the actuators 4 control the damping force of the shock absorbers 3.

The turning state inference unit 6 has a quick-turning state inference means 8 which infer the quick-turning state of the vehicle 11 during a sharp cornering. When the vehicle 11 is in the sharp cornering, the output signal ωy of the yaw angular velocity sensor 2 is produced in the same manner as the aforementioned turning state. The quick-turning state inference means 8 calculates an absolute value |Dωy| of a change rate in the output signal ωy. And, the quick-turning state inference means 8 issues data of the inferred rolling state during the sharp cornering by retrieving from its map, which is shown in table 3 bellow, and further computing the absolute value |Dωy| of change rate and the output signal V from the vehicle speed sensor 1. As a result, the quick-turning state inference means 8 produces an output signal for controlling the rolling state during sharp cornering. The operation circuit 7 which receives the output signal from the quick-turning state inference means 8 produce each signal for driving the actuators 4. And, the actuators 4 control the damping force of the shock absorbers 3.

Table 3 below shows the map for the quick-turning state inference means 8.

TABLE 3

| Change rate | Vehicle speed | | | | |
|---|---|---|---|---|---|
| | V0–V1 | V1–V2 | V2–V3 | V3–V4 | V4–V5 |
| Dωy1–Dωy2 | DUMP 0 | DUMP 1 | DUMP 2 | DUMP 3 | DUMP 5 |
| Dωy2–Dωy3 | DUMP 0 | DUMP 2 | DUMP 4 | DUMP 6 | DUMP 7 |
| Dωy3–Dωy4 | DUMP 0 | DUMP 3 | DUMP 6 | DUMP 8 | DUMP 9 |
| Dωy4–Dωy5 | DUMP 0 | DUMP 5 | DUMP 7 | DUMP 9 | DUMP 10 |

Table 4 below shows the operating parameters of the table 3 for a concrete example.

TABLE 4

| |Dωy| | Vehicle speed | |
|---|---|---|
| | 0(km/h) or more –below 20(km/h) | 20(km/h) or more –below 40(km/h) |
| 15(deg/sec²) or more –below 20(deg/sec²) | 0.20 | 0.25 |
| 20(deg/sec²) or more –below 25(deg/sec²) | 0.20 | 0.30 |
| 25(deg/sec²) or more –below 30(deg/sec²) | 0.20 | 0.35 |
| 30(deg/sec²) or more | 0.20 | 0.45 |

| |Dωy| | Vehicle speed | |
|---|---|---|
| | 0(km/h) or more –below 20(km/h) | 20(km/h) or more –below 40(km/h) |
| 15(deg/sec²) or more –below 20(deg/sec²) | 0.30 | 0.35 |
| 20(deg/sec²) or more –below 25(deg/sec²) | 0.40 | 0.50 |
| 25(deg/sec²) or more –below 30(deg/sec²) | 0.50 | 0.60 |
| 30(deg/sec²) or more | 0.55 | 0.65 |

| |Dωy| | Vehicle speed 80(km/h) or more |
|---|---|
| 15(deg/sec²) or more –below 20(deg/sec²) | 0.45 |

TABLE 4-continued

| 20(deg/sec²) or more –below 25(deg/sec²) | 0.55 |
|---|---|
| 25(deg/sec²) or more –below 30(deg/sec²) | 0.65 |
| 30(deg/sec²) or more | 0.70 |

Apart from the above-mentioned embodiment wherein the rolling state of the vehicle 11 during turning is supposed with such map, a modified embodiment may be such that the rolling state of the vehicle is inferred by computing an output signal V of the vehicle speed sensor 1 and an output signal ωy of the yaw angular velocity sensor 2.

Figure 3:
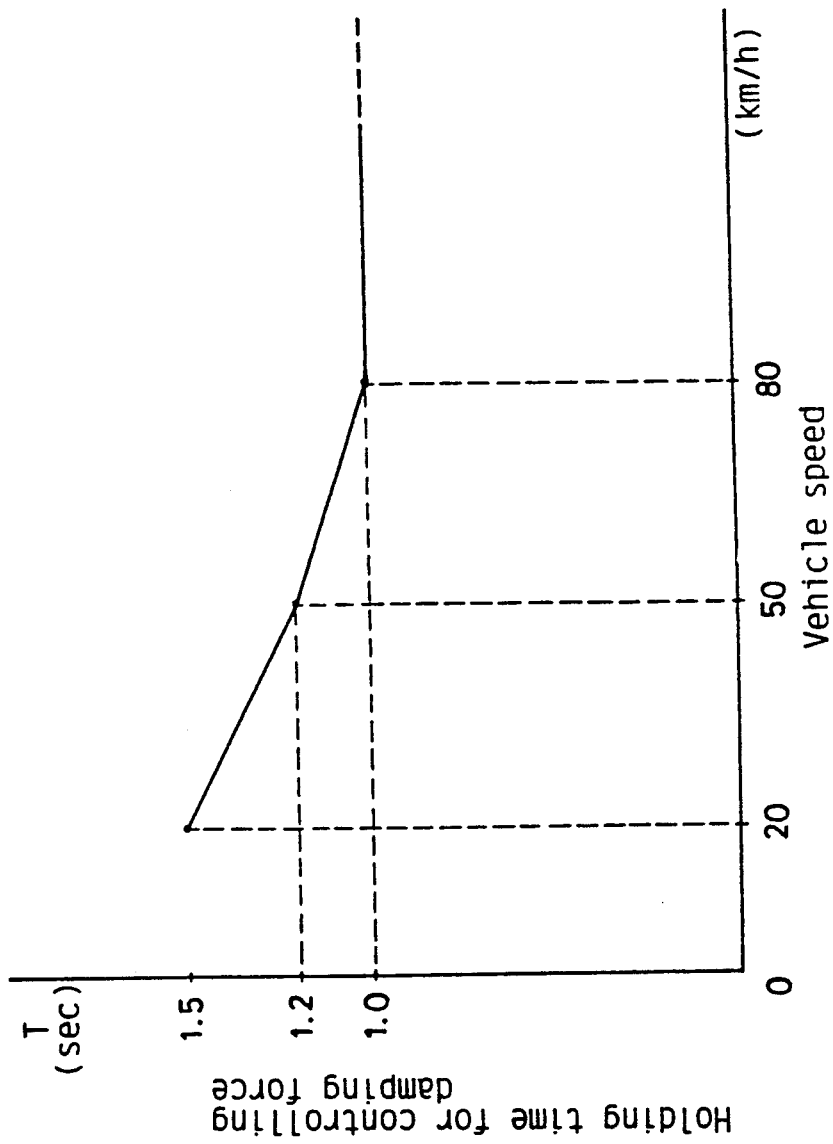
FIG. 3 shows a characteristic diagram of the holding time for controlling damping force of the suspension control apparatus shown in FIG. 1.

FIG. 3 shows a characteristic diagram of the holding time T for retaining the damping-force after completion of the turning state. Since the rolling of the vehicle 11 remains a little by inertial force of the vehicle after finish of turn of the vehicle 11, the vehicle 11 needs retention of its damping force of the shockabsorber 3 for a predetermined holding time T. As shown in FIG. 3, when the vehicle speed is below 20 km/h, the suspension control apparatus does not increase the damping force. After finishing a turning at a speed above 20 km/h, the suspension control apparatus retains controlling (retention of increased state) of the shockabsorber 3 for the holding time T. The holding time T in which the damping force is retained to be increased is made shorter as the vehicle speed is higher. And, when the vehicle speed is above 80 km/h, the holding time T is set up to be constant, such as at 1.0 sec, as shown in FIG. 3. This setting is experimentally found preferable.

Apart from the above-mentioned embodiment wherein the holding time T is decided responding to the vehicle speed, a modified embodiment may be such that the holding time T is set constant, or alternatively to respond to the displacement interval of the vehicle 11 after finish of the ordinary-turning state or the quick-turning state. On the contrary to the above-mentioned embodiments, in case of some kinds of vehicles, such as a coach or a large truck the holding time T may be set up to become larger when the vehicle speed is moved faster.

Figure 4:
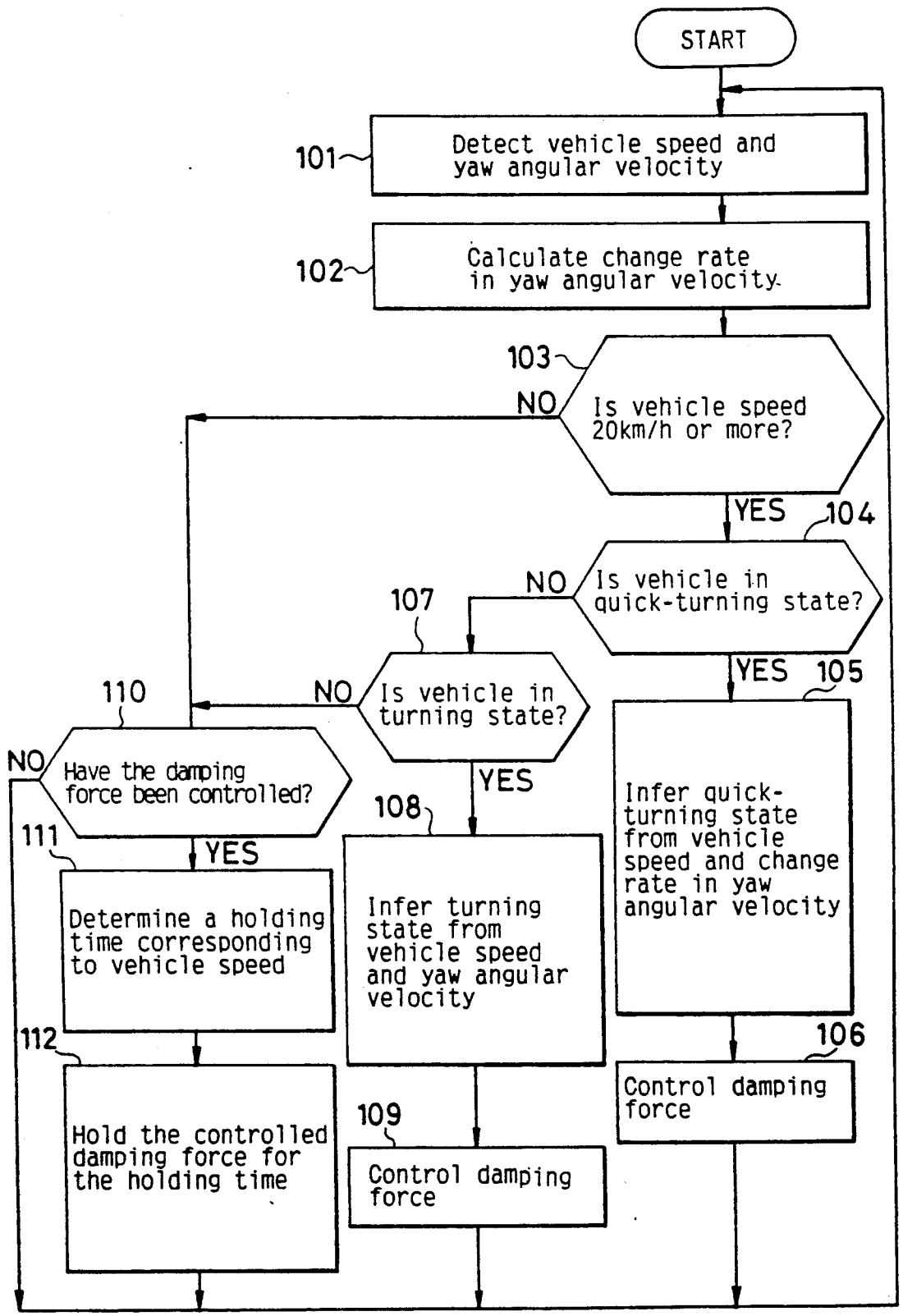
FIG. 4 shows a flow chart of operation of the suspension control apparatus according to the present invention.

FIG. 4 shows a flow chart in the controller 5 of the suspension control apparatus of the present invention.

In step 101 of FIG. 4, the output signal V from the vehicle speed sensor 1 and the output signal ωy from the yaw angular velocity sensor 2 are detected. A change rate Dωy in the output signal ωy of the yaw angular velocity sensor 2 is calculated in step 102. Next, in step 103, it is judged whether the vehicle speed is on or above 20 km/h. In case of below 20 km/h, it is not judged that the vehicle 11 is turning even when the vehicle 11 is turning. Therefore, the shock absorbers 3 are kept in normal condition of normal damping force. When the vehicle speed is 20 km/h or more, it is decided whether the vehicle 11 is in a quick-turning state in step 104. Namely, when the value of the output signal V of the vehicle speed sensor 1 is of the predetermined value V1 or more, and further the absolute value |Dωy| of the change rate of the output signal ωy reaches the predetermined ratio Dωy 1 or more, it is judged that the vehicle 11 is in a quick-turning state.

That is when the conditions (3) and (4):

$$V \geq V1 \tag{3}$$

and $$|D\omega y| \geq D\omega y\,1 \qquad (4)$$

are satisfied by the detected signals, the controller 5 in step 104 judges that the vehicle 11 is turning quickly. When the controller 5 judges "YES" in step 104, that is, the vehicle 11 is in a quick-turning state, the quick-turning state inference means 8 infers that the rolling state is quick-turning by the mapping (the aforementioned table 3) in step 105. AS a results, the suspension control apparatus controls to increase the damping force of the shockabsorbers 3 in step 106.

When the controller 5 in step 104 judges "NO", that is, the vehicle 11 is not in a quick-turning state, it is judged whether the vehicle 11 is in a turning state or not in step 107. Namely, the value of the output signal V of the vehicle speed sensor 1 becomes the predetermined value V or more, and further the value of the output signal $\omega y$ from the yaw angular velocity sensor 2 reaches the predetermined ratio $\omega y\,1$ or more, as shown by the following formulas (5) and (6):

$$V \geq V1 \qquad (5)$$

and $$\omega y \geq \omega y 1 \qquad (6)$$

That is when the conditions (5) and (6) are satisfied by the detected signals, the controller 5 in step 107 judges that the vehicle 11 is in an ordinary-turning state. When the controller 5 judges "YES" in step 107, that is, the vehicle 11 is in the ordinary-turning state, the turning state inference unit 6 infers that the rolling state is turning by the mapping (the aforementioned table 1) in step 108. As a result, the suspension control apparatus controls to increase the damping force of the shock absorbers 3 in step 109.

When the controller 5 in step 107 judges "NO", the controller 5 judges whether the shockabsorbers 3 have been controlled or not in step 110. When the controller 5 in step 110 judges "YES", the holding time T in which the damping force is controlled after the ordinary-turning state is judged responding to the output signal V from the vehicle speed sensor 1 in step 111, as aforementioned wave form shown in FIG. 3. And, in step 112, the controlled damping force of the shock absorbers 3 are kept for the holding time T after turning.

After holding the damping force of the shockabsorbers 3 for the holding time T, the shockabsorbers 3 return to normal damping force which lasts until the suspension control apparatus detects the next ordinary-turning state or quick-turning state.

On the contrary, in step 110, when the controller 5 judges that the shockabsorbers 3 have not been controlled to decrease the damping force, the shockabsorbers 3 is kept in normal condition continuously.

Since the suspension control apparatus of the present invention controls the damping force of the shock absorbers 3 by using only two signals, namely, the output signal V of the vehicle speed sensor 1 and the output signal $\omega y$ of the yaw angular velocity sensor 2, the time required for computing by the controller 5 is short. For example, in case of using an 8 bit CPU as the arithmetic unit 10, the operation times for computation of a control signal, namely the time period from reception of detection signals the arithmetic unit 10 to issuance of output signal to the actuators 4 takes about 5 msec. Accordingly, the suspension control apparatus of the present invention can control the damping force to increase in response to a rotation around the yaw axis B of the vehicle when it makes a quick-turning or sharp cornering.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A suspension control apparatus comprising:
   a vehicle speed sensor for detecting a speed of a vehicle and producing a speed output signal indicative thereof,
   a yaw angular velocity sensor for detecting an angular velocity about a yaw axis of said vehicle to detect a turning state of said vehicle and producing a yaw signal indicative thereof,
   shock absorber means having an adjustable damping force which is controlled in response to an applied signal; and
   turning state inference means for storing a map between said vehicle speed, said yaw angular velocity, and a damping force for said shock absorber means, which is based on an amount of turning of the vehicle indicated by said vehicle speed and said yaw angular velocity, and for using said speed output signal of said vehicle speed sensor and said yaw signal of said yaw angular velocity sensor to address said map to output a corresponding damping force to said shock absorber means as said applied signal.

2. A suspension control apparatus in accordance with claim 1, wherein
   said shock absorber means produce a damping force corresponding to a largest output signal of said turning state inference means.

3. A suspension control apparatus in accordance with claim 1 or claim 2, wherein
   said shock absorber means maintains a state of controlling the damping force thereof for a predetermined time which corresponds to a vehicle speed when turning, even after a decrease of said output signal of said yaw angular velocity sensor to below a predetermined value.

4. A suspension control apparatus in accordance with claim 1, which further comprises:
   quick-turning inference means, receiving said speed output signal of said vehicle speed sensor and said yaw signal of said yaw angular velocity sensor, for calculating a change rate of said yaw signal, and for determining a quick-turning state of the vehicle from said speed output and said change rate thereby to control said damping force of said shock absorber means in response to an output signal of said quick-turning state inference means.

5. A suspension control apparatus in accordance with claim 4, wherein
   said shock absorber means produce a damping force corresponding to a largest output signal of said quick-turning state inference means.

6. A method of controlling a suspension of an automobile, comprising the steps of:
   providing a shock absorber having an adjustable damping force, which damping force is controllable in response to an applied signal;

storing in advance a map between a speed of the vehicle, a yaw angular velocity of the vehicle, and a damping force for the shock absorbers based on an amount of turning of the vehicle indicated by the vehicle speed and the yaw angular velocity;

obtaining a measure of a current vehicle speed and a current yaw angular velocity;

using said current vehicle speed and said current yaw angular velocity to address said map and obtain said damping force therefrom; and using said damping force from said map to control a damping force of said shock absorber means.

* * * * *